United States Patent [19]

Jones

[11] Patent Number: 5,705,977
[45] Date of Patent: Jan. 6, 1998

[54] MAINTENANCE REMINDER

[76] Inventor: James L. Jones, 2312 Green Acre Ave. #1, Anaheim, Calif. 92801

[21] Appl. No.: 504,821

[22] Filed: Jul. 20, 1995

[51] Int. Cl.$^6$ ..................................................... B60Q 1/00
[52] U.S. Cl. .................. 340/457.2; 340/457; 340/457.4; 340/438
[58] Field of Search .................. 340/457.2, 438, 340/439, 457.4, 457, 945; 364/424.04, 424.03; 116/299

[56] References Cited

U.S. PATENT DOCUMENTS

| | | | |
|---|---|---|---|
| 3,546,693 | 12/1970 | Bessett et al. | 340/457.4 |
| 3,776,177 | 12/1973 | Bryant et al. | 235/114 X |
| 3,962,986 | 6/1976 | Fujita et al. | 235/95 R |
| 4,031,363 | 6/1977 | Freeman et al. | 340/457.4 |
| 4,138,964 | 2/1979 | Fujita | 116/62.4 |
| 4,404,641 | 9/1983 | Bazarnik | 340/457.4 |
| 4,593,263 | 6/1986 | Peckworth | 340/457.4 |
| 4,942,841 | 7/1990 | Drucker, Jr. | 116/317 |
| 5,006,829 | 4/1991 | Miyamoto et al. | 340/457.4 |
| 5,516,018 | 5/1996 | Eskandry | 224/312 |

*Primary Examiner*—Jeffery Hofsass
*Assistant Examiner*—Anh La
*Attorney, Agent, or Firm*—Gene Scott; Patent Law & Venture Group

[57] ABSTRACT

A maintenance scheduling device having a face plate with a front surface providing a plurality of aligned maintenance item description labels, a plurality of recommended interval description labels, a plurality of aligned numeral wheel assemblies for displaying last service maintenance and a plurality of aligned numeral wheel assemblies for displaying next service maintenance. The device may also include a programmable electrical signal processor interconnected with a power source, an odometer of the vehicle, and a memory device containing recommended maintenance mileage information for each maintenance item, the processor serving to signal a user when a recommended service interval has elapsed on the actual mileage recorded on the odometer. The device opens to reveal a set of maintenance guide charts for the vehicle of choice.

9 Claims, 4 Drawing Sheets

MAINTENANCE REMINDER

BACKGROUND OF THE INVENTION

1. Field of the Invention

This invention relates generally to reminder displays, and more particularly to an improved reminder display chart designed to display maintenance and service information in a way that is easy to modify and customize as desired.

2. Description of Related Art

All automobiles require periodic servicing and inspection of brakes, oil filter, spark plugs, tires, and other such parts. The frequency for these various services depends, in large part, upon the distances driven since the last service. Each type of vehicle has a recommended maintenance schedule for each of these different services. However, if an automobile owner does not keep close records of the various services, it is difficult to have these services performed in a timely manner, which may result in unnecessary breakdowns and added costs of ownership. To help owners keep track of dates and mileage between services, a variety of different maintenance displays have been invented. Such displays are generally designed to be placed in the vehicle to remind the owner when common services need to be performed.

For example, Drucker, Jr. U.S. Pat. No. 4,942,841 discloses an automotive vehicle service reminder display device comprised of a shallow box or case having a principal rectangular face wall, side walls and end walls within which are mounted rows of indicia wheels organized between the divider walls; and a case closure plate for maintaining the indicia wheels in operative alignment. The principal face wall of the device includes a number of viewing ports through which indicia information and data imprinted on the periphery of the wheels may be read. The indicia wheels are individually rotatable through the viewing ports by finger tip pressure and movement to a set appropriate data.

Bryant et al. U.S. Pat. No. 3,776,177 discloses an apparatus for indicating mileage for various automotive maintenance periods, the device having numerical indicia carrying wheels arranged in rows and columns, each wheel rotatable by an operator's fingers from the rear of the apparatus and visible individually from the front. Indicia adjacent each row indicates the type of maintenance to be performed with a blank space for one row having a writing surface for special notations by an operator. A magnet is included for attaching the apparatus to the automobile, as is a clip for attaching it to the sun visor.

Fujita et al. U.S. Pat. No. 3,962,986 discloses a set of display wheels jointly driven from a conventional vehicle odometer so as to complete a revolution each time the vehicle travels a predetermined distance. Each display wheel has one or more warning zones on its circumference such that each warning zone, when turned to a display position for observation by the vehicle driver, indicates the fact that some particular part of the vehicle is in need of inspection or servicing. The display device further comprises means for automatically locking any one of the display wheels against rotation when the warning zone turns to the display position, and means for unlocking and resetting the display wheel after the necessary inspection or servicing by depressing a push button.

Fujita U.S. Pat. No. 4,138,964 discloses an automobile service and inspection time indicating device in which the members for performing the resetting operation are recessed from the surface of the outer plate of the meter case to avoid inadvertent operation of the resetting mechanism. The indicating elements can be positively seen during the daytime or at night.

Peckworth U.S. Pat. No. 4,593,263 teaches a mileage recording and service reminding accessory for a shared use vehicle. The device is a self-contained unit and may be installed as original equipment at the time of manufacture or added as modification accessory to an existing vehicle. The console includes auxiliary individual odometers hour meters for different persons authorized to use the vehicle, a master meter within the console, an electric circuit operable to selectively connect a desired auxiliary odometer or hour meter to the master meter, and a service warning meter for registering and displaying pre-selected target mileages for prescribed service.

However, while the prior art devices are somewhat useful in keeping track of a vehicle's maintenance schedule, they are plagued with several problems. First of all, many of these devices provide a set list of maintenance items to be monitored as well as set maintenance interval recommendations for these items, thus only allowing the user to manually change the mileage at the last and next services. While these standard maintenance items and intervals may be sufficient for some vehicles, they are not accurate or pertinent for all vehicles. Thus, there is a clear need for an improved scheduling device that allows the user to select which maintenance items are to be monitored and what the recommended maintenance interval is for each item so as to be easily tailored to meet the needs of any type of vehicle.

These prior art devices are also significantly limited in that they provide the user little or no assistance in determining what the maintenance schedule for the vehicle should be. In addition, the preferred maintenance schedule for many vehicles includes a large number of different services that cannot all possibly be incorporated into the schedule device, thereby frequently causing additional services that are not displayed on the device to be neglected. Thus there is a clear need for an improved scheduling device which not only displays the service schedule for selected maintenance items, but also provides the user with a quick and efficient means by which to review all recommended services.

The present invention fulfills these needs and provides further related advantages as described in the following summary.

SUMMARY OF THE INVENTION

The present invention is an improved maintenance scheduling device designed to provide advantages not attainable by similar prior art scheduling devices. The present invention is preferably included in a rectangular housing having as one external surface a display plate which displays service information for several different vehicle maintenance items. Preferably, the display is set up so that user can select which maintenance items are to be monitored by simply adhering labels that describe the desired maintenance item to the display plate in a vertical column. Likewise, the user can select the interval at which each of the selected maintenance items should be performed by again adhering labels describing the desired service intervals onto the display plate in a vertical column next to the corresponding item description labels. Numeral wheels are also provided on the display, one column of wheels being manually rotated to display the mileage at which a given maintenance item was last performed, and another column of wheels being rotated to display the mileage at which the service should once again be performed. Thus it is a primary object of the present invention to provide an easy and convenient means by which to monitor a variety of vehicle maintenance items. It is also a primary object of the present invention to allow the user to select exactly which maintenance items are to be monitored and displayed, and exactly what the recommended maintenance interval for each item should be. This is a significant advantage of the present invention, as it allows the user to tailor the scheduling device to meet the service needs of each individual vehicle.

A clear cover is positioned over the display plate in order to prevent the numeral wheels from being inadvertently adjusted or the labels from being accidentally removed. The cover is hingably attached to the plate so that the wheels and labels may be accessed as needed. Although the device may simply be a flat sheet with a display on one side, the display plate is preferably integrated into a rectangular housing with side wall extending rearwardly from an outer edge of the plate and a rear wall fastened to the side wall so as to form a space within the housing. The rear wall is preferably hingeably attached to the side walls so that it may be opened and the space may be easily accessed. This space may be used to store the labels for use on the display plate, and it is also preferably used to store a plurality of flat maintenance cards provided with the device. The rear wall preferably includes a mirrored surface. Clips are provided on the housing so that the entire device may be secured to a visor of a vehicle. Thus it is an object of the present invention to provide a device that is not only very useful in monitoring service items, but also provides storage space within the device and a means by which to conveniently store the device in an easily accessible location in the vehicle.

The maintenance cards are designed to give more detailed service information that cannot be efficiently displayed on the face plate. This information may be organized in a variety of ways. In one preferred method, the cards are arranged according to service intervals so that all maintenance procedures that should be performed every 250 miles are on one card, all procedures that should be performed every 3,000 miles are on another card, etc. This way, when the display indicates that it has been 3,000 miles since the last oil change, the user simply finds the card giving the complete listing of all procedures to be performed every 3,000 miles. This effectively prevents the user from forgetting to have many minor procedures performed. Thus, it is an object of the present invention to significantly improve over prior art devices by providing a way by which to keep track of all needed vehicle service, not just those displayed on the face plate of the device.

It is another object of the invention to provide a device that provides information to the user in a quick, convenient and organized fashion. To ensure that the maintenance cards remain in a logical, easy-to-use order and are not misplaced, a hook or other such means for supporting the cards is provided within the space between the plates. The supporting means is preferably such that the cards are captured by the supporting means and thus can be moved so that both the front and back sides of the cards are visible, and yet the cards cannot be lost or taken out of order.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a maintenance scheduling device. In such drawings.

DETAILED DESCRIPTION OF THE PREFERRED EMBODIMENT

Figure 1:
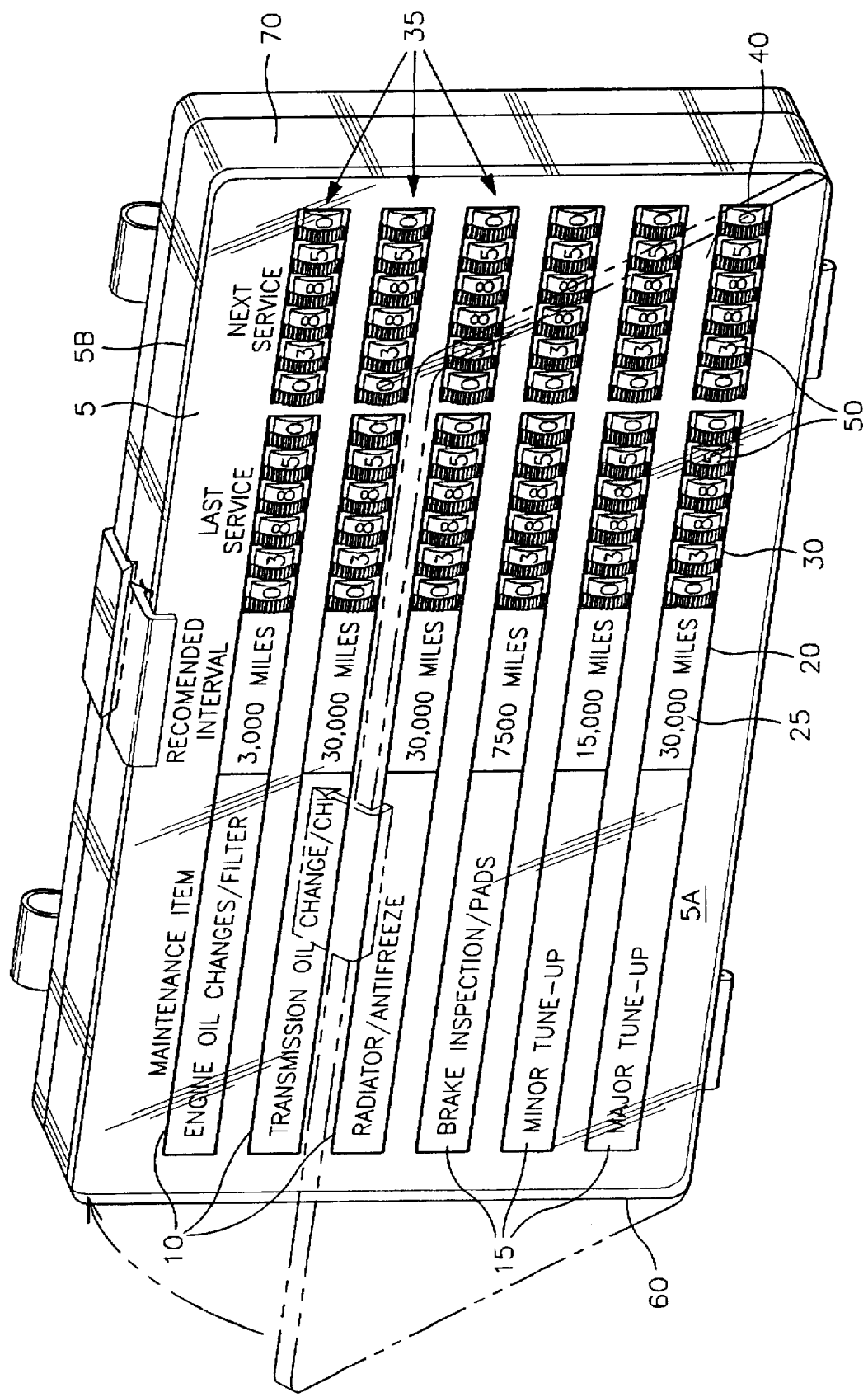
FIG. 1 is a perspective view of a preferred embodiment of the present invention, particularly showing maintenance item and recommended mileage interval between maintenance item labels, and numeral wheels for depicting the mileage of the last service and the mileage of the next service for each item, and a hinged clear cover.
Figure 2:
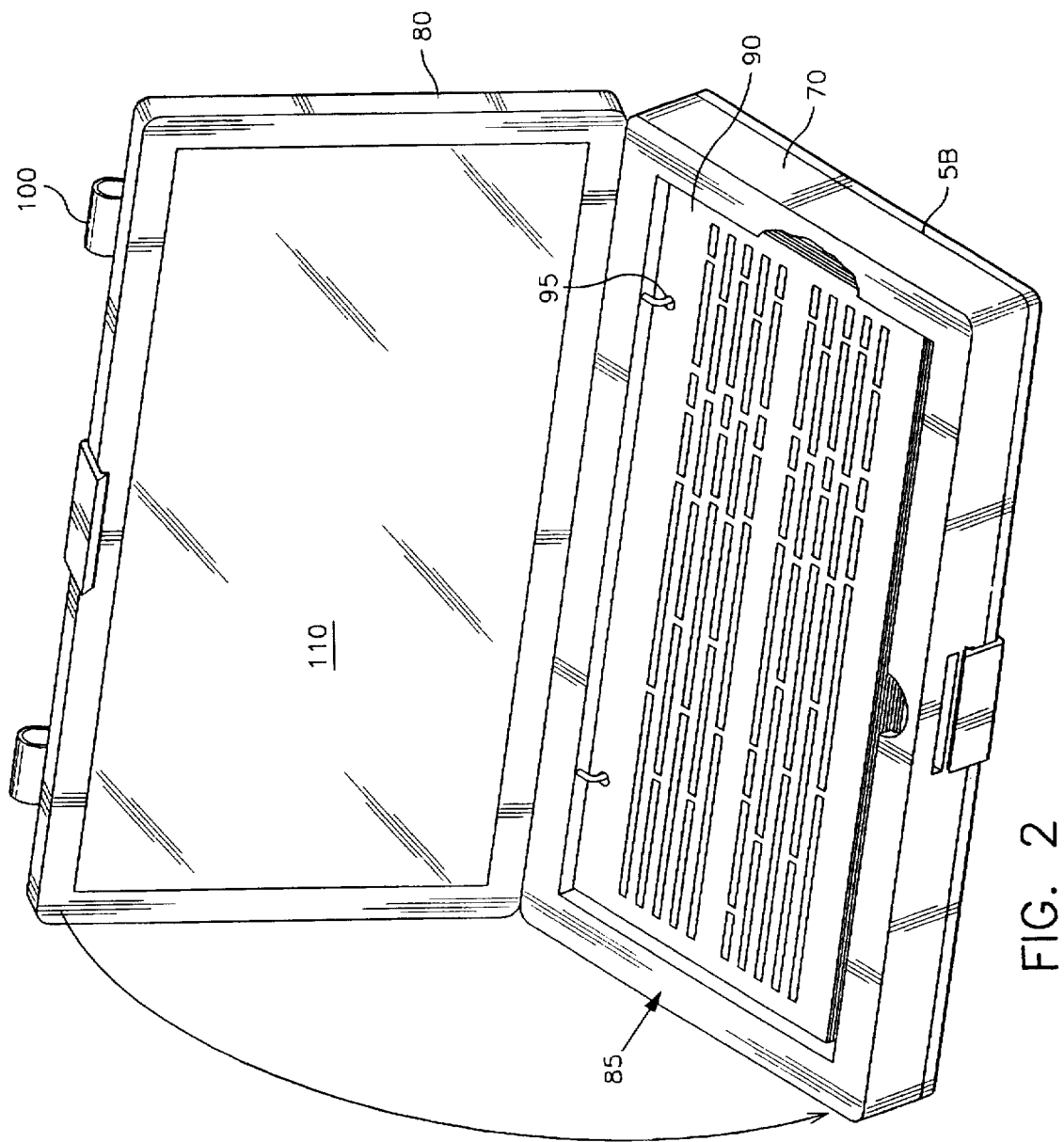
FIG. 2 is a perspective view of the invention of FIG. 1, particularly showing how the case of the invention opens to reveal maintenance cards within a space.
Figure 3:
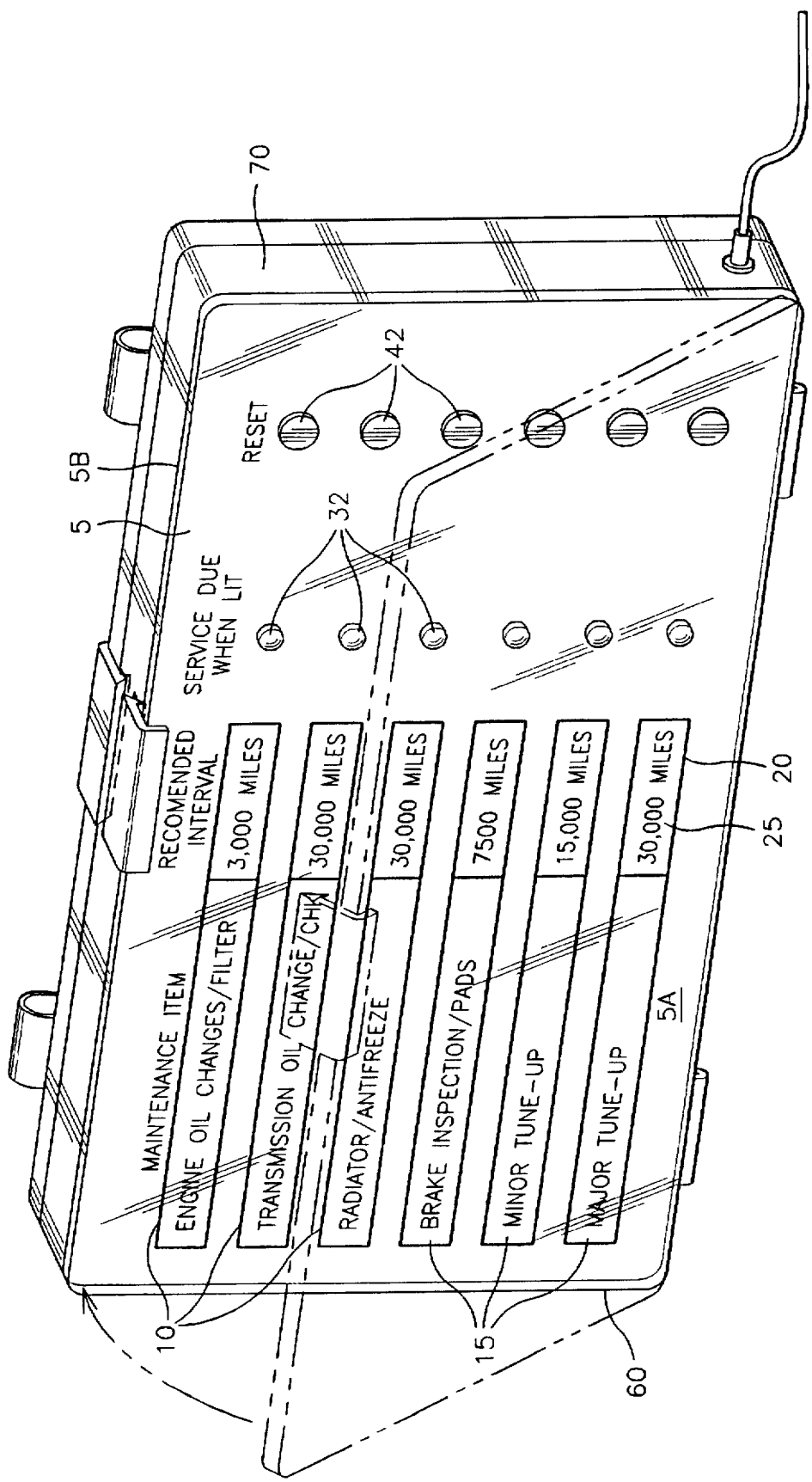
FIG. 3 is a perspective view of an alternate embodiment of the particularly showing service due lamps and reset buttons.
Figure 4:
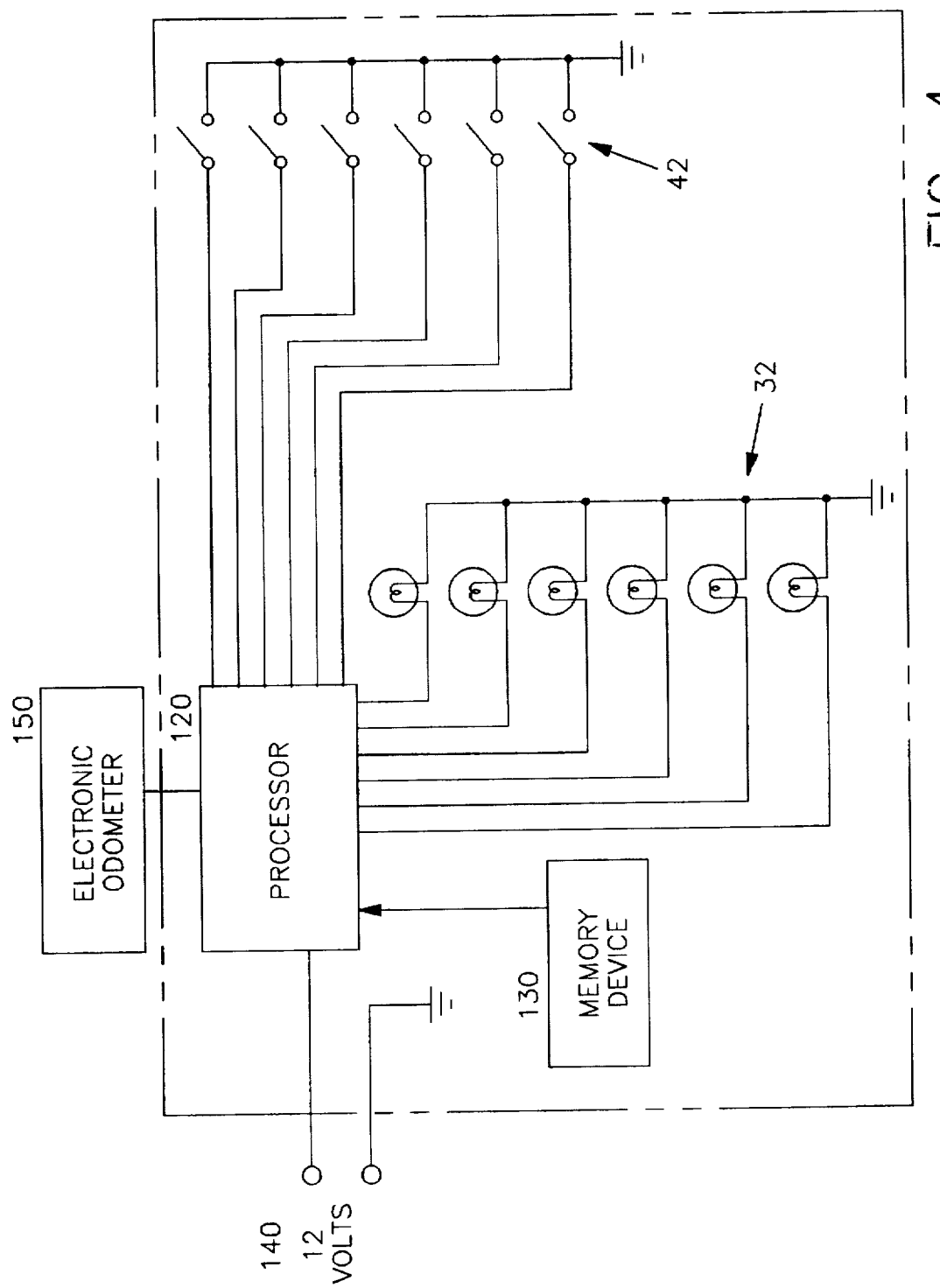
FIG. 4 is a schematic diagram of the invention of FIG. 3 showing the electrical interconnection between a processor, a power source, a memory device and an odometer of a vehicle.

FIGS. 1 and 2 show a maintenance scheduling device for use in keeping track of an automobile's maintenance and service schedule. The device includes a vertically oriented face plate 5 that has an front surface 5A and an exterior peripheral edge 5B. The front surface 5A provides a plurality of aligned first marks 10, each mark sized and arranged for accepting a maintenance item description label 15 and a plurality of aligned second marks 20, each mark sized and arranged for accepting a recommended interval description label 25. The face plate 5 also includes a plurality of first 30 and second 40 aligned apertures designed to retain several manually adjustable numeral wheel assemblies 50.

Preferably a plurality of the maintenance item description labels 15 describing a variety of typical maintenance items such as oil change, brake inspection, tune-up, etc. and a plurality of recommended interval description labels 25 describing a variety of different recommended maintenance intervals, preferably in terms of miles driven, are provided with the scheduling device. As clearly seen in FIG. 1, the item description labels 15 are sized so as to fit within the first marks 10 and the second labels are sized so as to fit within the second marks 20, thus allowing the user to select the desired labels and position them in alignment with the first and second marks as desired. Alternately, both the maintenance item description labels 15 and the interval description labels 25 may be permanently secured to the face plate surface 5A in alignment with the first and second marks. The numeral wheel assemblies 50 held within the first aligned apertures 30 are designed to display either the date or the mileage at the time of the last service, while the numeral wheel assemblies 50 held within the second aligned apertures 40 are designed to display the date or mileage at which the next service maintenance should be performed.

As illustrated in FIG. 1, all of the marks and apertures are preferably aligned so as to form a plurality of horizontal rows 35 consisting of one first mark 10, one second mark 20, one first aperture 30 and one second aperture 40, the labels and wheel assemblies in each row 35 designed to display information relating to a single maintenance item. Alternately, the marks and apertures may be arranged so as to form a plurality of horizontal rows (not shown) so that the labels and numeral wheels in each column display information pertaining to a single maintenance item. In addition, while the marks and apertures are preferably arranged in the order described above, this order may also vary as desired. Preferably, as illustrated in FIG. 1, category headings, such as "Maintenance Item," "Recommended Interval," "Last Service" and "Next Service" are positioned over the appropriate marks and apertures so as to make the display more comprehensible.

To use the scheduling device, a user selects the maintenance item description label 15 which describes the maintenance item that the user would like to monitor, as for example "Engine Oil Change." The user then selects the recommended interval description label 25 that displays the recommended maintenance interval, for example "3,000 miles," for the selected maintenance item. The selected item description label 15 is then aligned with one of the first marks 10 and positioned in contact with the face plate 5, and the interval description label 25 is then positioned in alignment with the second mark in the same horizontal row 35. Next, the user adjusts the numeral wheels 50 in the first aperture 30 of the same horizontal row 35 so that the wheels display the mileage or date at the time the selected maintenance item, in this case "Engine Oil Change," was last performed. Finally, the user adjusts the numeral wheels 50 in the second aperture 40 in the same horizontal row 35 to display the mileage or date at which the next oil change, or other selected maintenance item, should be performed in accordance with the corresponding recommended interval label 25. This procedure is simply repeated until the user has positioned all the desired labels on the face plate surface 5A. Once a given service has been performed, the user simply manually readjusts the numeral wheels.

A detachable clear cover 60 is preferably fastened to the face plate 5 so as to prevent the labels and the numeral wheels from being inadvertently moved. The cover 60 is hingably fastened to the face plate so that it may be pivoted to expose the front surface 5A, thus allowing for adjustment of the wheel assemblies 50 and alteration of the labels 15 and 25. Alternately, once the desired labels have been properly positioned, the cover 60 may be screwed or otherwise secured to the face plate, the cover 60 providing openings (not shown) over the first and second apertures for accessing the numeral wheel assemblies 50 as needed.

Preferably, a side wall 70 is integral with and extends rearwardly from the exterior peripheral edge 5B of the face plate 5, and a rear plate 80 is preferably hingably fastened to the side wall 70 so as to form a space 85 between the plates, as seen in FIG. 2. The rear plate 80 may be pivoted between a closed orientation in which the rear plate 80 is in parallel alignment with the face plate 5 and the space 85 is fully enclosed, and an open position in which the space 85 is exposed and the contents accessible, as illustrated in FIG. 2.

A plurality of flat maintenance cards 90 are preferably included with the scheduling device to provide the user with a variety of additional pertinent maintenance information. These cards 90 can be used to monitor other maintenance items in addition to those displayed on the face plate surface. In order to most efficiently provide information in an organized manner, a maintenance card supporting means 95 is preferably provided for supporting the maintenance cards 90 in the space 85 in such a way as to allow both sides of the cards to be conveniently viewed in an organized manner. As illustrated in FIG. 2, in one preferred embodiment the supporting means 95 consists of a pair of hooks on which the cards 90 are movable. The hooks are positioned in spaced apart relationship, appending from the sidewall and the cards each provide a pair of holes in spaced alignment corresponding to the hooks so that the cards are pivotally movable on the hooks to reveal either of the sides of each of the cards while maintaining the cards in an ordered sequence.

Preferably, the device includes an attaching means 100 for temporarily attaching it to an object, such as a visor of a vehicle, where it is easily viewed as needed. The attaching means 100 may be a clip, strap or any other such convenient means for attaching the device to an object. Still further, the rear plate 80 preferably includes a mirrored surface 110. The use of a mirrored surface 110 is especially useful when the device is secured to the visor where a mirror is typically secured.

In an alternate embodiment of the present invention, the maintenance scheduling device has the same basic structure detailed above. However, instead of first and second apertures, 30 and 40, a plurality of lamps 32 and a plurality of reset switches 42 are mounted to the face plate 5 in alignment so that each horizontal row 35 contains one first mark 10 with a item description label 15, one second mark 20 with an interval description label 25, one lamp 32 and one reset switch 42, all of which correspond to a particular maintenance item.

A programmable electrical signal processor 120 of any general programmable type well know in the art, is interconnected with a memory device 130, preferably, a solid state memory, which stores the recommended maintenance mileage interval information for each different maintenance item. This memory device 130 may store general mileage interval information that can be applied to a variety of different vehicles, or, preferably, the memory device 130 is vehicle specific so that it contains mileage interval information specific to the user's particular vehicle. If it is later desired to use the device in conjunction with a different vehicle, the user must simply replace the memory device 130.

The signal processor 120 is also further electrically interconnected with a power source 140, such as a vehicle's 12-volt battery, an odometer 150 of the vehicle and the lamps 32 and switches 42 mounted to the face plate 5. Thus, when one of the maintenance items is due for service in accordance with the mileage interval information recorded in the memory device 130 and the actual mileage recorded on the odometer, the processor 120 enables the lamp in the row 35 corresponding to the given maintenance item to be lit, thereby signaling the user that it is time to perform that maintenance item. Once the necessary maintenance has been performed, the user disables the lit lamp by pressing the corresponding reset switch.

In this embodiment, it is preferable that the labels 15 and 25 be permanently affixed to the face plate 5 so that they remain in the same horizontal row as the corresponding lamp and reset switch.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A maintenance scheduling device comprising:

a vertically oriented face plate having a front surface, the surface providing a plurality of aligned first marks for receiving maintenance item description labels, the surface further providing a plurality of aligned second marks for receiving recommended maintenance interval description labels, the face plate mounting a plurality of lamps and a plurality of reset switches, each one of the first marks being aligned with one of the second marks, and with one each of the lamps and reset switches;

a programmable electrical signal processor interconnected with a memory device, the memory device storing recommended maintenance mileage interval information corresponding to each of the recommended maintenance interval description labels, the signal processor further electrically interconnected with a power source, an odometer of a vehicle, and with the lamps and the switches, the processor enabling the lighting of each of the lamps when the corresponding maintenance item is due in accordance with the mileage interval information and the actual mileage information, each of the reset switches disabling each of the lit lamps respectively;

the device further including a side wall integral with an exterior peripheral edge of the face plate and extending rearwardly therefrom and a rear plate hingably fastened to the side wall, the rear plate positionable in a closed orientation enclosing the side wall and face plate so as to form a space therebetween, and further positionable in an open orientation exposing the space, and a plurality of flat maintenance cards enclosed within the space and a means for supporting the maintenance cards comprising a pair of hooks positioned in spaced apart relationship on the sidewall, the cards each providing a pair of holes in spaced alignment corresponding to the hooks so that the cards are pivotally movable on the hooks to reveal either of the sides of each of the cards while maintaining the cards in an ordered sequence.

2. The device of claim 1 further including a datachable clear cover positioned over the front surface of the face plate.

3. The device of claim 2 wherein the clear cover is hingably fastened to the face plate so that the cover may be moved to a position for exposing the front surface of the face plate for access to the reset switches.

4. The device of claim 1 further including a side wall integral with an exterior peripheral edge of the face plate and extending rearwardly therefrom.

5. The device of claim 4 further including a rear plate hingably fastened to the side wall, the rear plate positionable in a closed orientation enclosing the side wall and face plate so as to form a space therebetween, and further positionable in an open orientation exposing the space.

6. The device of claim 5 further including a plurality of flat maintenance cards enclosed within the space.

7. The device of claim 6 further including a means for supporting the maintenance cards so that the cards may be turned over for viewing both sides of the cards.

8. The device of claim 6 further including a mirrored surface on the rear plate.

9. The device of claim 1 further including a means for attachment of the device to a visor of a vehicle.

* * * * *